Aug. 7, 1945.  A. B. ROEHR  2,381,689
DITCH DIGGER
Filed Oct. 23, 1943  8 Sheets-Sheet 1

Albert B. Roehr
Inventor

By Russell Eaton
Attorney

Aug. 7, 1945.　　　A. B. ROEHR　　　2,381,689
DITCH DIGGER
Filed Oct. 23, 1943　　　8 Sheets-Sheet 2

Inventor
ALBERT B. ROEHR
By
James Eaton
Attorney

Aug. 7, 1945.  A. B. ROEHR  2,381,689
DITCH DIGGER
Filed Oct. 23, 1943  8 Sheets-Sheet 3

Fig_4

Fig_5  Fig_6

Fig_7

ALBERT B. ROEHR
Inventor

By
Attorney

Aug. 7, 1945.   A. B. ROEHR   2,381,689
DITCH DIGGER
Filed Oct. 23, 1943   8 Sheets-Sheet 4

Fig_8

Fig_9

ALBERT B. ROEHR
Inventor

Paul S. Eaton
Attorney

Fig_11    Fig_12

Fig_13    Fig_14

Albert B. Roehr
Inventor

Aug. 7, 1945.  A. B. ROEHR  2,381,689
DITCH DIGGER
Filed Oct. 23, 1943  8 Sheets-Sheet 8

Fig. 17

Albert B. Roehr
Inventor

By

Attorney

Patented Aug. 7, 1945

2,381,689

UNITED STATES PATENT OFFICE 2,381,689

DITCH DIGGER

Albert B. Roehr, Sarasota, Fla.

Application October 23, 1943, Serial No. 507,406

10 Claims. (Cl. 37—81)

This invention relates to a ditch digger and more especially to a wheeled framework having mounted for vertical movement thereabove a second or upper framework which has mounted thereon a suitable prime mover such as an internal combustion engine which is geared to a vertically disposed screw, so that when the upper frame is lowered relative to the lower frame, the screw will be lowered into the ground, and as the wheeled framework is pulled along over a field by a suitable tractor, a ditch will be dug by the rotating screw.

It is an object of this invention to provide a ditch digger comprising a wheeled framework adapted to be towed by a suitable tractor, and having mounted thereon for vertical adjustment a power driven screw which is adapted to be lowered into the ground to dig a ditch while the wheeled framework is being moved over the ground.

It is another object of this invention to provide a ditch digger comprising a wheeled framework with a vertically adjustable power driven spiral screw for digging a ditch while the framework is towed over the ground, said spiral screw having associated therewith suitable deflecting means for the earth which is raised upwardly by the screw so that the earth will be diverted on each side of the ditch and removed a safe distance from the ditch to prevent its falling back into the ditch after the ditch digger has passed therealong.

It is another object of this invention to provide a ditch digging machine comprising a wheeled framework adapted to travel over the ground and a vertically adjustable framework mounted thereon, the vertically adjustable framework having mounted thereon a power driven screw and said screw having associated therewith a suitable housing encasing the rear portion of the screw, so that the earth which is displaced by the screw will be raised upwardly and cast laterally to prevent its falling back into the ditch.

Some of the objects of the invention having been stated, other objects will appear as the description proceeds, when taken in connection with the accompanying drawings, in which—

Referring more specifically to the drawings, the numerals 10 and 11 indicate the side members of the lower frame which converge towards the front and are joined together at the front, and have a suitable hitch 12 secured thereto provided with a slot 13 and a pin 14 for coupling the frame to a suitable tractor. The lower frame has secured to the lower surfaces of side members 10 and 11 a suitable axle 15 which is preferably bowed forwardly in the central portion thereof as at 16 to provide clearance for the screw in the raising and lowering operation. The ends of the axle have rotatably mounted thereon suitable wheels 17 and 18, and suitable step plates 19 and 20 are secured to the side frames 10 and 11 and the axle 15. Pivotally secured to a cross bar 9 extending between the side frames 10 and 11 and near side frame 10 are a pair of links 21 and 22, and secured to bar 9 near the side frame member 11 is another pair of struts 23 and 24, these being pivotally secured in suitable bearing blocks 25 and 26 secured to the bar 9. These constitute the front pivoting of the struts for supporting the front portion of the upper frame. Near the rear end of members 10 and 11 are similar struts 27 and 28 which are secured to the rear end of side frame member 10 and the pair of other struts 29 and 30 are pivotally secured at their lower ends to the rear end of the side frame member 11. The lower ends of these struts 27 and 28 and also struts 29 and 30 are pivoted onto suitable bolts 32 and 33 mounted in suitable bearing blocks 34 and 35 in the rear portion of side frame members 10 and 11.

Figure 15:
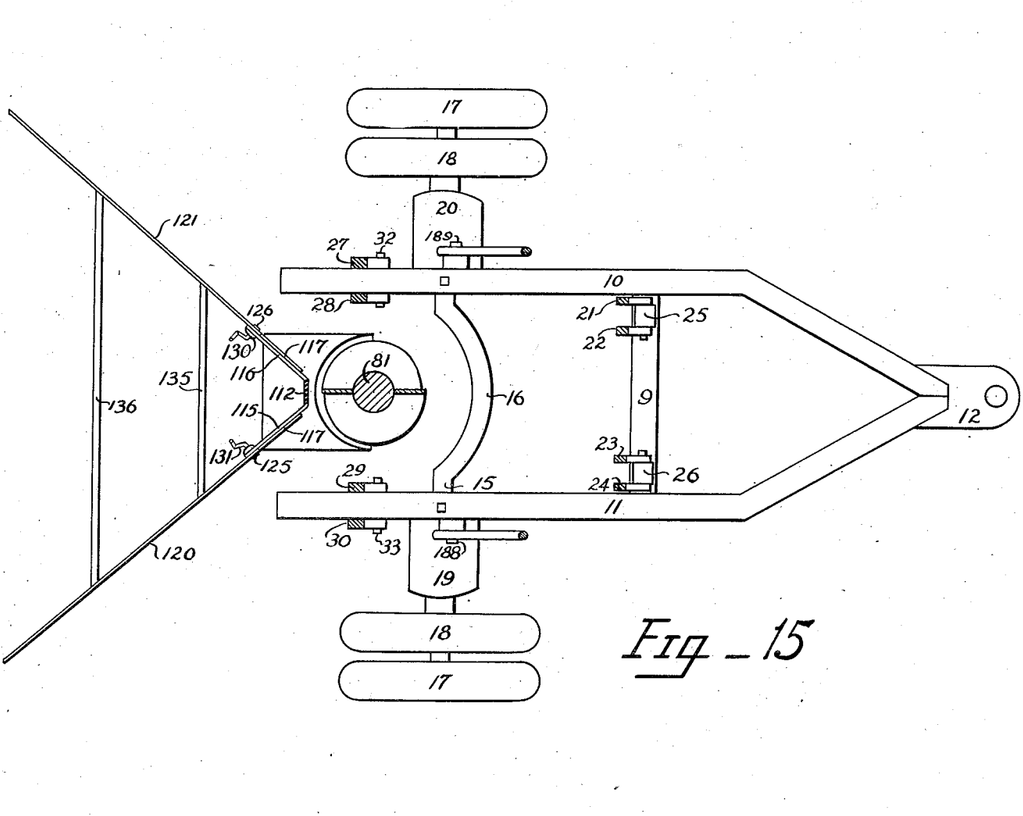
Figure 15 is a sectional plan view taken along the line 15—15 in Figure 1.

The upper frame comprises side angle iron members 40 connected at their front and rear portions by suitable angle iron members 42 and 43, and a suitable steel plate 44 bridges the space between these angle members to support an internal combustion engine 45. The upper ends of the struts 27 and 28 are pivotally secured to a pin 50 in the rear end of one of the side members 40 of the upper frame. The struts 29 and 30 at their upper ends are pivotally secured to a pin 51 in the rear end of the other side member 40 of the upper frame. The upper ends of the front struts 21 and 22 and 23 and 24 are pivotally secured to bearings and pins on a cross bar extending between the side frame members 40, this not being shown, but being identical to the mounting of the lower ends of these front struts, as shown in Figure 15 except that the bearing blocks and pins are on the lower side of the cross bar similar to bar 9 in Figure 15. The internal combustion engine 45 has a conventional radiator 60 with suitable connections to the engine for providing a conventional cooling system. It also has a fuel tank 61 which has suitable connections to the carburetor of the engine, not shown. To the rear of the engine is a suitable transmission mechanism 62 having a conventional lever 63 for effecting the proper change gear operations. Projecting from the rear end of this transmission housing 62 is a conventional drive shaft 64 with a conventional universal joint therein. This drive shaft extends rearwardly and enters a suitable and conventional speed reduction housing 65 which has an upper section 65a and a lower section 65b which are secured together by suitable bolts 66, and these bolts not only penetrate the portions 65a and 65b, but also penetrate the flat top plate 44 for holding the speed reduction housing in position. The plate 44, of course, has a suitable hole therethrough, through which the portion 65b projects downwardly. The lower end of housing 65b has a suitable flange 68 with a suitable opening therethrough, through which drive shaft 70 for the screw projects. Bolted to the lower flange 68 of the housing 65a by means of bolts 67 is the peripheral portion of a packing gland 72 which projects upwardly into the housing in a conventional manner, and around the drive shaft 70 for the screw, and bolts 67 penetrate the lower flange 68 of the lower housing 65b and also the peripheral flange of the packing gland or nut 72 to provide a suitable packing around the drive shaft 70 to prevent lubricant within the housing 65 from draining downwardly around the drive shaft 70. The lower end of the drive shaft 70 has a suitable flange 75 penetrated by suitable bolts 76 which also penetrate a flange 80 secured on the upper end of the screw 81. This screw has a pair of spiral convolutions 83 and 84 extending from the bottom upwardly about one-half the distance of the screw, and these merge into and form a part of the upwardly projecting vanes 87 and 88, which vanes serve to eject the dirt and to kick it clear of the path traveled by the screw. It is to be noted that vanes 87 and 88 are sloped slightly rearwardly, that is, where the inner edges of the vanes are welded to the main shaft of the screw, the upper portions of these vanes are disposed backwardly about two inches further than the lower portions of the vertically disposed vanes to therefore give a suitable upward and rearward slope to the kicking vanes to cause them to more effectively shed the dirt.

Figures 1, 16:
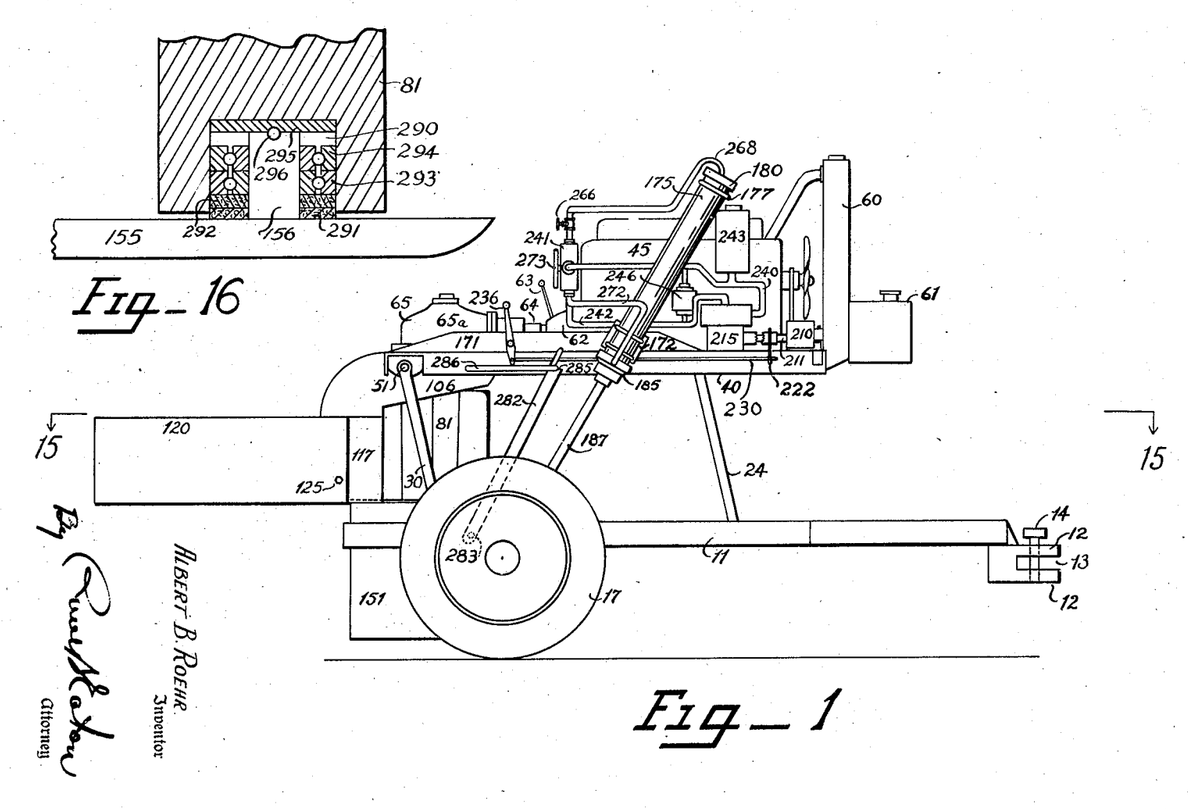
Figure 1 is a side elevation of the apparatus.
Figure 16 is an enlarged vertical sectional view showing the mounting for the lower end of the screw.
Figure 2:
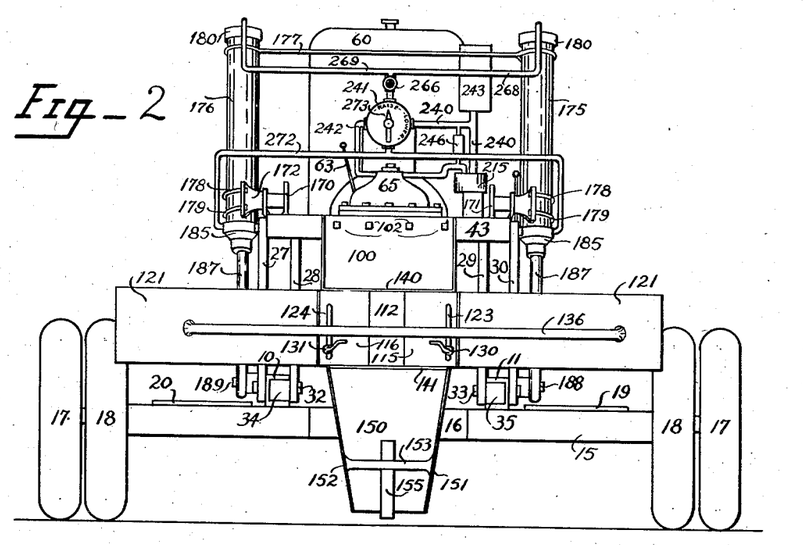
Figure 2 is a rear elevation looking from the left-hand end of Figure 1.
Figure 3:
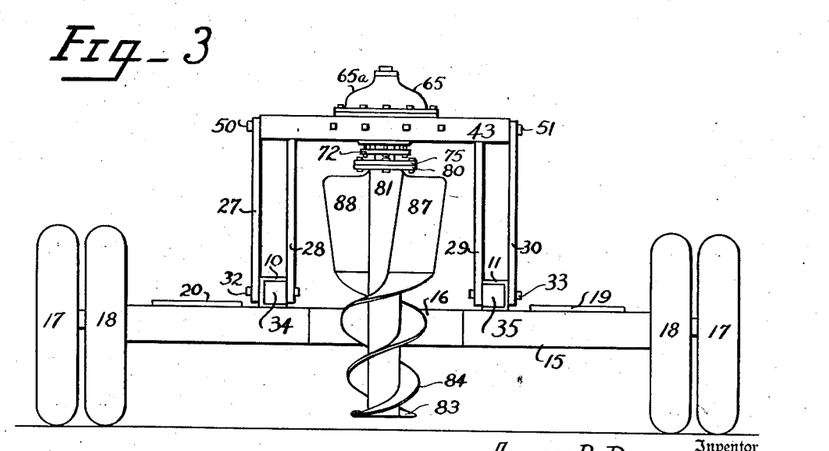
Figure 3 is a view similar to Figure 2, but showing the deflecting vanes and housing surrounding the screw removed.
Figure 4:
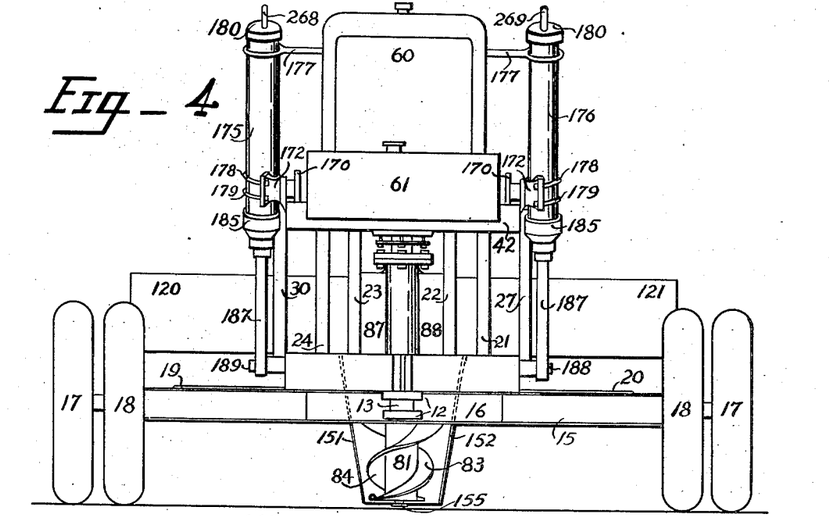
Figure 4 is a front elevation of the apparatus.
Figure 10:
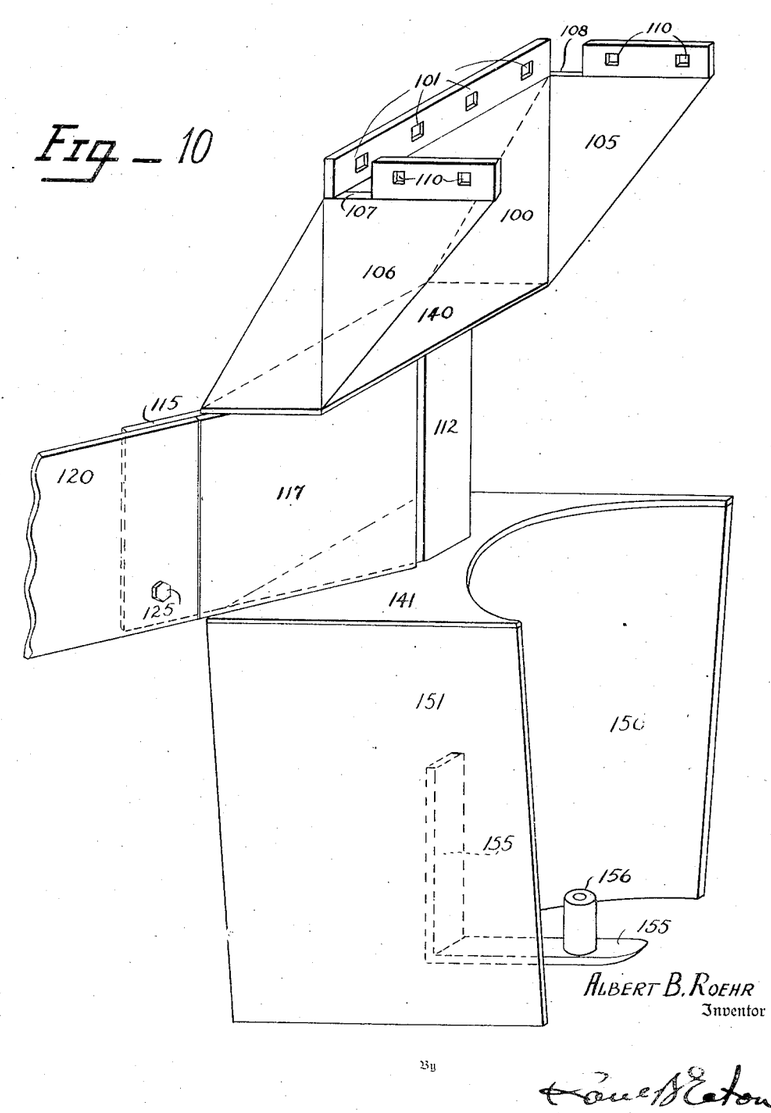
Figure 10 is an isometric view of the housing and vanes associated with the screw showing the same removed from the frame.

The rear portion 43 of the upper framework has secured thereto the upper end of the housing and associated parts serving to elevate the dirt loosened by the screw, and to assist the screw in elevating the dirt and for deflecting it laterally away from the ditch made by the screw. This mechanism comprises a portion 100 having holes 101 therethrough, which by means of suitable bolts 102 secure this housing to the rear portion 43 of the upper framework. The portion 101 has a pair of forwardly projecting portions 105 and 106 having notches 107 and 108 therein for fitting around the rear angle member 43 of the upper framework. The upper portions of these side plates having suitable holes 110 therein by means of which the housing is additionally and rigidly secured to a pair of ribs (not shown) on the lower surface of plate 44. The housing also has extending downwardly from the vertical portion 100 a vertical narrowed portion 112 which has projecting in divergent relation therefrom a pair of vanes 115 and 116. These vanes have suitable plates 117 welded on their outside surfaces to form shoulders at their rear edges against which vanes 120 and 121 abut. The rearwardly directed vanes 115 and 116 have vertically disposed slots 123 and 124 which are slidably penetrated by suitable bolts 125 and 126 which are lodged in the diverging vanes 120 and 121 and on the threaded ends of these bolts 125 and 126, there are secured nuts 130 and 131 respectively which have integral therewith a crank or wing so that the same can be loosened and tightened without employing a wrench. The additional vanes 120 and 121 which are secured to the shorter diverging vanes 115 and 116 by means of bolts 125 and 126 have suitable cross struts 135 and 136 for providing a rigid frame for expelling the dirt laterally from each side of the furrow formed by the screw. To the lower edge of the vertically disposed plate 100, and to the upper edges of plate 112 and the rearwardly diverging vanes 115 and 116, there is welded a plate 140, and to the lower surfaces of diverging vanes 115 and 116 and to the lower surface of the narrow vertically disposed portion 112, there is also welded a plate. This plate 141 has a substantially semi-circular front surface to loosely fit around the screw 81. Secured to the lower edge of flat plate 141 having the front portion thereof of substantially semi-circular shape is a substantially semi-circular and substantially vertically disposed plate 150 and to the side front edges of this plate 150 are secured side plates 151 and 152 whose upper edges are also welded to the horizontal plate 141. Disposed between the lower inner surfaces of plates 151 and 152 is a brace or strut 153. To the lower rear edge of the curved plate 150 forming the wall at the rear of the screw, there is secured an L-shaped bracket 155 whose lower horizontal leg projects forwardly and has a suitable pin 156 projecting upwardly therefrom to form a bearing for the lower end of the screw. The lower end of the screw has a vertically disposed bore 290 therein, and between the pin 156 and bore 290 and between the inner walls of the bore 290 and the upwardly projecting pin 156, there is a pair of radial thrust bearings 293 and 294 and below these a pair of washers 291 and 292 preferably of leather, all of this serving as a suitable bearing for the lower end of the screw, and the washers 291 and 292 serving to prevent entrance of grit and dirt into the radial thrust bearings. All of the bearings and the washers are completely enclosed within the cavity or bore 290 at the lower end of the screw, and an end thrust bearing comprising a blade 295 and ball 296 is disposed in the upper end of the cavity for providing a suitable bearing to support the lower end of the screw shaft.

Figure 9:
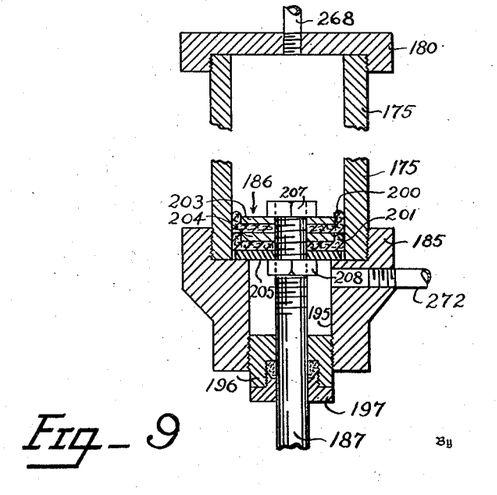
Figure 9 is a longitudinal sectional detail view through one of the hydraulic lifts, showing the central portion thereof broken away.
Figure 13:
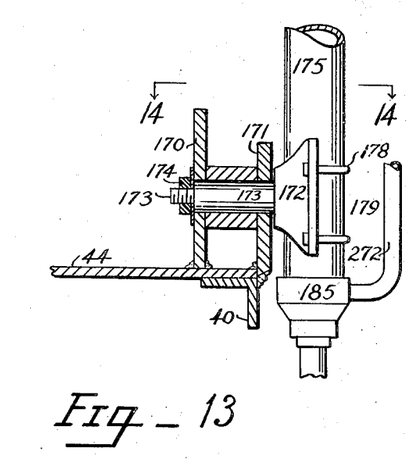
Figure 13 is an elevation showing the means for pivotally mounting the hydraulic lift cylinders.
Figure 14:
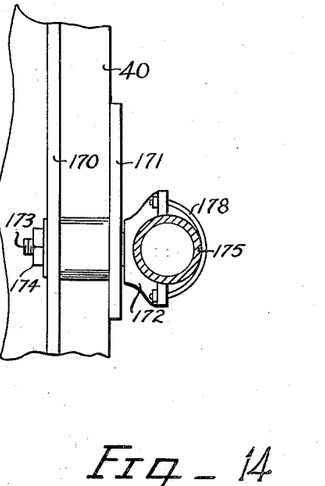
Figure 14 is a cross-sectional view taken along the line 14—14 in Figure 13.

Rising upwardly from each of the side frame members 40 of the upper frame is a pair of plates 170 and 171. A suitable casting 172 having bolt 173 integral therewith is disposed on the outside of plate 171. This bolt penetrates suitable holes in the plates 170 and 171 and is confined by a suitable means, such as a nut 174, and this allows rotative movement of the members 172 and 173 relative to the plates. The outer surfaces of these members 172 have concave surfaces or cavities which are adapted to receive the cylinders 175 and 176 of the lifting mechanism. The upper ends of the cylinders 175 and 176 are joined together by a brace 177. A pair of U bolts 178 and 179 penetrate members 172 and surrounds the cylinders 175 and 176 and confine them in a rotative manner to the upper side frames. Each of these cylinders is identical, and a description of one will suffice. Each cylinder has a cap 180 closing its upper end, and a cap 185 closing its lower end. Disposed within each of the cylinders is a piston 186 having a rod 187 projecting downwardly therefrom, the lower end of each of these rods being pivotally secured to the lower side frame members 11 and 10, as at 188 and 189 respectively. The cap 185 on the lower end of each of these cylinders is illustrated in Figure 9, and it is there seen that it has a restricted portion 195 so as to limit the downward movement of the piston in the cylinder. This restricted portion is closed by a suitable nut 196 which is threadably secured in the lower restricted portion of the cap and this nut has a suitable packing gland 197 such as is employed in conventional valve stems. The piston 186 is of any desired construction, and I have shown it in Figure 9 as comprising leather washers 200 and 201 together with metallic washers 203, 204, and 205, the leather washers and metallic washers forming the pistons being secured on the piston rod 187 by nuts 207 and 208, the upper end of the piston rod being threaded for this purpose.

Figure 11:
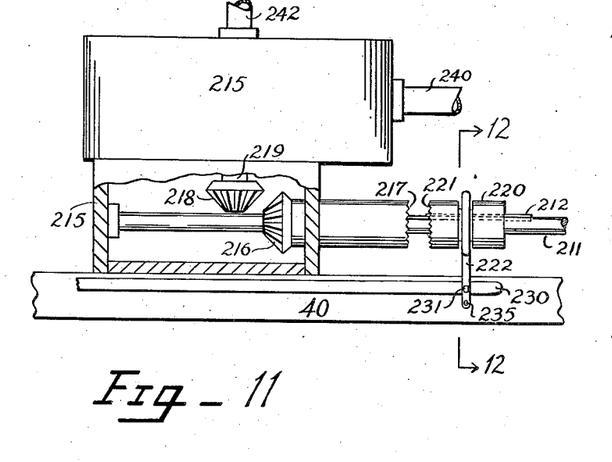
Figure 11 is an elevation, partly in section, showing the clutching means for clutching and declutching in the hydraulic pump.
Figure 12:
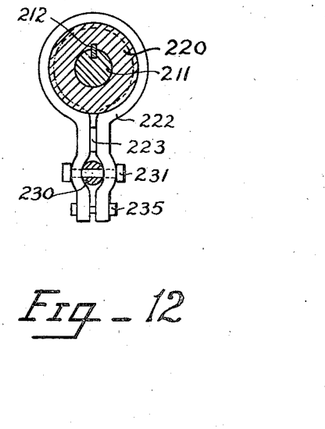
Figure 12 is a vertical sectional view taken along the line 12—12 in Figure 11.

A suitable gear mechanism housed in a housing 210 is driven by the engine, and this has a shaft 211 extending rearwardly therefrom. This shaft is rotatably mounted in the lower end of pump housing 215, and rotatably and slidably mounted on this shaft is a beveled gear 216 which projects forwardly out of the lower portion of the housing, and has a clutch face 217 thereon. Beveled gear 216 is adapted to engage and drive beveled gear 218 on pump shaft 219. Keyed on the shaft 211 by key 212 for sliding movement is a member 220 having a clutch face 221 for engaging the clutch face 217. This member 220 has a peripheral groove therein in which is loosely fitted a member 222 which has a block 223 to prevent its being clamped too tightly around the member 220. This member 222 fitting loosely in the peripheral groove surrounds a shaft 230, and a bolt 231 secures this member 222 surrounding the peripheral groove in the clutch face member 220 to a shaft 230, and a bolt 235 also secures the ends of the member 222 together. The rod 230 projects rearwardly and is secured to an operating lever 236 so that the centrifugal pump 215 can be clutched into or out of operation. The specific structure of the centrifugal pump is not shown, because it is conventional.

Figures 5, 6, 7:
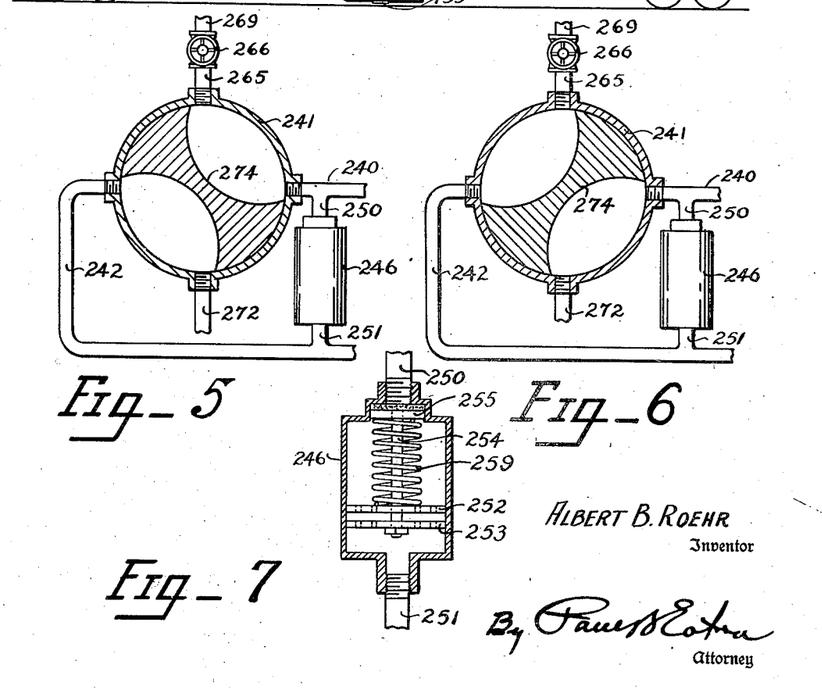
Figure 5 is an enlarged vertical cross-section through the control valve for the hydraulic means.
Figure 6 is a view similar to Figure 5, but showing the valve in a different position.
Figure 7 is a longitudinal sectional view through the check valve disposed between the supply and return pipe from the hydraulic pump to the control valve.
Figure 8:
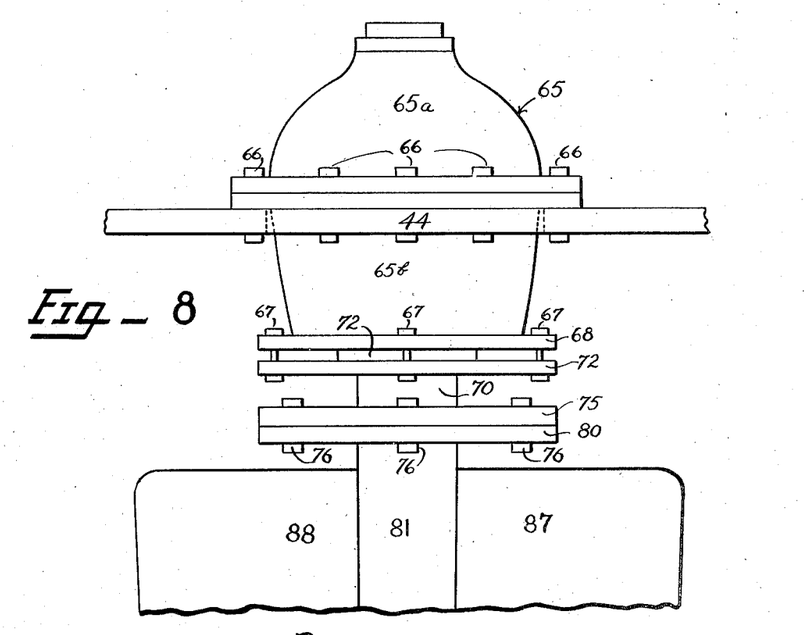
Figure 8 is an enlarged detail of the upper portion of the screw looking from the rear of the machine.

Leading from the output side of the centrifugal pump housing 215 is a pipe 240 which leads to a 4-way valve 241 having a core 274 with handle 273. Leading from this valve housing 241 is a return pipe 242 which enters the intake portion of the centrifugal pump. Disposed between these input and output flexible pipes or hose 240 and 242 is a suitable spring pressed check valve 246 shown in detail in Figure 7. Short pipes or hose 250 and 251 connect this check valve housing 246 to these two pipes 240 and 242, and fixedly disposed in this housing is a pair of perforated plates 252 and 253 which are slidably penetrated by a valve stem 254, and a valve 255 on one end thereof tends to close communication between the input and output pipes 240 and 242 on account of the compression spring 259 holding it in closed position. Should the 4-way valve be in a position to prevent flow of fluid through the system, or should the pump be not declutched when the upper frame has been raised or lowered, the check valve mechanism would give way and allow the fluid to continue to circulate if the pump should be left running.

Connected to the 4-way valve housing 241 is a pipe 265 having a valve 266 therein, and extending from this valve are flexible pipes or hose 268 and 269 which are connected to the upper end of each of the cylinders, or rather to the caps 180 fitting on the upper end of the cylinders, and establishing communication with the upper end of the lift cylinders. Projecting from the 4-way valve housing is a flexible pipe or hose 272 whose two branches extend to the lower end of the cylinders 175 and 176. With the valve in the position shown in Figure 5, the fluid will be forced into the upper ends of the cylinders to force the pistons downwardly therein to lift the mechanism to the position shown in Figures 1 to 4 inclusive. If desired, at this time, when the mechanism is fully lifted, valve 266 can be manually closed, and this will confine the liquid within the cylinders and hold the upper frame in elevated position. At this time, the operator would then declutch the hydraulic or centrifugal pump from the driving mechanism of the engine, but if he should neglect to do so, the pressure of the fluid would then open the check valve 255 between the output and input pipes 240 and 242 and no damage would be done to the hydraulic pump. When it is desired to allow the upper frame to lower, then the valve 274 would be turned to the position shown in Figure 6, and the fluid would be pumped through pipes 240 and 272 into the lower ends of the cylinders and the fluid displaced from the upper end of the cylinders would return through pipes 268 and 269, valve 266 being opened, of course, and this would allow the weight of the frame assisted by the centrifugal pump to lower the upper frame down against the lower frame to operating position, so as to embed the screw in the earth for the digging of a ditch.

Connected to pipe 240 is an expansion tank 243 into which surplus fluid can be forced when the upper framework is moved to lowered position. This expansion tank is provided due to the fact that when the pistons move upwardly in the cylinders 175 and 176, the piston rods 187 will displace some fluid, and thus the cylinders will hold less fluid than when the upper frame is in raised position. This surplus fluid can be forced against the air normally in the sealed tank 243, and thus prevent the system from being overloaded.

In the event that it should not be desired to employ the hydraulic lift mechanism to hold the upper frame in elevated position at all times, there is shown a bar 282 pivoted to the lower frame as at 283 and extending upwardly and having a notch 285 therein, which is adapted to engage one end of a looped bar 286 secured to the upper side frame member 40. This looped bar not only serves as a means for engaging the notch in the bar 282, but also serves as a guideway for the bar and limits its pivotal movement as to its upper end and prevents its falling down to the ground, or onto the lower frame.

Figure 17:
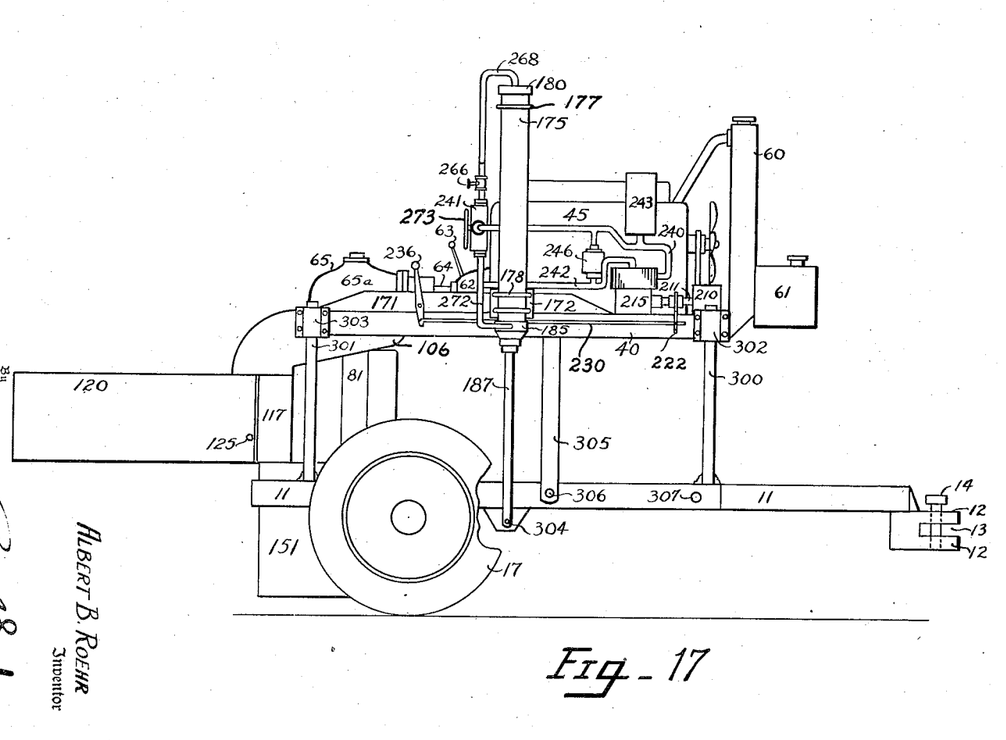
Figure 17 is a side elevation similar to Figure 1, but showing a modified form of the apparatus.

In Figure 17, there is shown a slightly modified form of the invention in which like reference characters apply to like parts. The only difference in this structure and the preceding figures is that the upper frame moves in a straight vertical line instead of swinging to the rear as it is lowered, and swinging upwardly and forwardly as it is raised. In this modified form, the lower frame has rising upwardly from the side bars 10 and 11 posts 300 and 301, there being two posts on the side bar 10 as well as on the side bar 11. These posts are rigidly secured to the lower frame as by welding, and slidably penetrate guideways 302 and 303 on the upper framework. The piston rods 187 are secured at their lower ends as at 304. The rest of the mechanism is identical to that previously described, but by this arrangement the upper frame moves in a straight line up and down to operative or inoperative positions.

Any suitable means for holding the upper frame in elevated position when it is not desired to hold it in such position by the hydraulic means may be provided, but I have shown a bar 305 pivoted as at 306 which, when raised in vertical position, abuts against the lower edge of the upper frame, and prevents its being lowered. When it is desired to lower the upper frame, the hydraulic means can be operated to slightly raise the upper frame to take the weight off of bar 305, and it can be allowed to move by gravity so that it is free, and will rest on the pin 307 to hold it in inoperative position.

Although in the drawings we have shown the ditch digging mechanism as being mounted on a trailer adapted to be towed by a suitable tractor, it is evident that the wheeled framework supporting the ditch digging mechanism could just as well be self-propelled by having suitable driving means and steering means, and I do not desire to be limited to the ditch digger being mounted on a trailer, and in the claims, I desire it to be understood that a wheeled framework can be either a towed wheeled framework or a self-propelled framework having suitable steering means thereon.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A ditch digger comprising a main wheeled frame and an upper frame mounted for up and down movement relative to the main frame, an engine mounted on the upper frame, a vertically disposed rotatable screw mounted on the upper frame and geared to the engine to be rotated thereby while the main frame is being moved over the ground, a member secured to the upper frame and projecting downwardly and having a semi-circular portion disposed behind the lower portion of the screw for assisting the rotating screw in raising the earth loosened by the screw, said member having rearwardly diverging vanes disposed above the semicircular portion for directing the raised earth laterally of the furrow formed by the screw, and means driven by the engine for raising and lowering the upper frame and its associated screw, the semi-circular portion having rearwardly directed parallel members secured to the outer edges thereof for pressing the walls of the ditch to prevent easy dislodgment of the earth in the walls of the ditch formed by the screw as the main frame is moved forwardly, the upper end of the screw having substantially vertically disposed vanes fixed thereon for deflecting the earth laterally which is raised by the screw.

2. Apparatus for digging ditches comprising a wheeled framework having a hitch whereby the same may be attached to a tractor to be moved over the ground, a movable framework disposed above the wheeled framework and carried by the wheeled framework, an internal combustion engine on the movable framework, a vertically disposed screw mounted on the movable framework and driven by the engine, means driven by the engine for raising and lowering the movable framework relative to the wheeled framework to thereby move the screw into the ground when the movable framework is lowered, and means for releasably securing the movable frame in raised position when it has been raised to a predetermined height by the means driven by the engine, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw.

3. Apparatus for digging ditches comprising wheeled framework having a hitch whereby the same may be attached to a tractor to be moved over the ground, a movable framework disposed above the wheeled framework and carried by the wheeled framework, an internal combustion engine on the movable framework, a vertically disposed screw mounted on the movable framework and driven by the engine, means driven by the engine for raising and lowering the movable framework relative to the wheeled framework to thereby move the screw into the ground when the movable framework is lowered, and means for releasably securing the movable frame in raised position when it has been raised to a predetermined height by the means driven by the engine, and a substantially semi-circular shield secured to the upper frame and disposed behind the screw and having laterally and rearwardly directed vanes associated therewith for cooperating with the rotating screw while the framework is travelling forwardly for raising the earth displaced by the screw and deflecting it outwardly on each side of the ditch formed by the screw, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw.

4. Apparatus for digging ditches comprising a wheeled framework having a hitch whereby the same may be attached to a tractor to be moved over the ground, a movable framework disposed above the wheeled framework and carried by the wheeled framework, an internal combustion engine on the movable framework, a vertically disposed screw mounted on the movable framework and driven by the engine, means driven by the engine for raising and lowering the movable framework relative to the wheeled framework to thereby move the screw into the ground when the movable framework is lowered, and means for releasably securing the movable frame in raised position when it has been raised to a predetermined height by the means driven by the engine, and a substantially semi-circular shield secured to the upper frame and disposed behind the screw and having laterally and rearwardly directed vanes associated therewith for cooperating with the rotating screw while the framework is travelling forwardly for raising the earth displaced by the screw and deflecting it outwardly on each side of the ditch formed by the screw, the laterally and rearwardly projecting vanes being vertically adjustable relative to the upper movable framework to regulate their position relative to the depth to which the screw is lowered into the earth, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw.

5. A ditch digger, comprising a main wheeled frame and an upper frame mounted for movement relative to the main frame, an engine mounted on the upper frame, a vertically disposed rotatable screw mounted on the upper frame and geared to the engine to be rotated thereby while the main frame is being moved over the ground, a member secured to the upper frame and projecting downwardly and having a semicircular portion disposed behind the lower portion of the screw for assisting the rotating screw in raising the earth loosened by the screw, said member having rearwardly diverging vanes disposed above the semicircular portion for directing the raised earth laterally of the furrow formed by the screw, the lower end of the semi-circular portion having a forwardly projecting portion disposed below the lower end of the screw provided with an upwardly projecting bearing pin, and the lower end of the screw having a cavity therein for the reception of the bearing pin, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw, and means driven by the engine for raising the upper frame relative to the wheeled frame.

6. A ditch digger comprising a main wheeled frame and an upper frame mounted for movement relative to the main frame, an engine mounted on the upper frame, a vertically disposed rotatable screw mounted on the upper frame and geared to the engine to be rotated thereby while the main frame is being moved over the ground, a member secured to the upper frame and projecting downwardly and having a semicircular portion disposed behind the lower portion of the screw for assisting the rotating screw in raising the earth loosened by the screw, said member having rearwardly diverging vanes disposed above the semicircular portion for directing the raised earth laterally of the furrow formed by the screw, the semi-circular portion having rearwardly directed parallel members secured to the outer edges thereof for pressing the walls of the ditch to prevent easy dislodgement of the earth in the walls of the ditch formed by the screw as the main frame is moved forwardly, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw, and means driven by the engine for raising the upper frame relative to the wheeled frame.

7. A ditch digger comprising a main wheeled frame and an upper frame mounted for movement relative to the main frame, an engine mounted on the upper frame, a vertically disposed rotatable screw mounted on the upper frame and geared to the engine to be rotated thereby while the main frame is being moved over the ground, a member secured to the upper frame and projecting downwardly and having a semicircular portion disposed behind the lower portion of the screw for assisting the rotating screw in raising the earth loosened by the screw, said member having rearwardly diverging vanes disposed above the semicircular portion for directing the raised earth laterally of the furrow formed by the screw, and means driven by the engine for raising and lowering the upper frame and its associated screw, the lower portion of the screw having spirally disposed vanes thereon for raising the earth and the upper portion of the screw having substantially vertically disposed and radially projecting vanes merging with the spiral vanes for throwing the earth which is raised by the spiral vanes radially of the screw.

8. In ditching machine, a wheeled framework, a movable framework mounted on top of the wheeled framework, the movable framework having a prime mover thereon, a vertically disposed screw mounted on the movable framework and projecting downwardly, the lower portion of the screw having spiral vanes thereon for moving the earth upwardly as the screw rotates, a connection between the prime mover and the screw for imparting rotation to the same, the spiral vanes on the screw at their upper ends extending upwardly in a straight line to form a pair of elongated vertically disposed vanes for propelling the earth radially of the screw when it reaches the top of the ground, the spiral vanes on the screw terminating approximately at ground level, and the vertically disposed vanes extending upwardly a substantial distance above the ground level, a curved shield member mounted on the movable framework and extending downwardly rearwardly and in close proximity to the screw and filling the ditch formed by the screw as the wheeled framework moves forwardly, the semi-circular member disposed rearward of the screw having secured at each edge thereof a pair of rearwardly projecting vanes to pack the walls of the ditch formed by the screw to prevent the earth from falling into the ditch, the semi-circular member having secured on the top thereof a pair of diverging vanes which are adapted to propel the earth away from the edges of the ditch formed by the screw in its forward travel, means operable by the prime mover for raising and lowering the movable frame relative to the wheeled frame to raise and lower the screw, the semicircular member and the diverging vanes relative to the ground over which the wheeled frame is adapted to travel.

9. A ditching machine comprising a wheeled frame, a movable frame disposed above the wheeled frame, the movable frame having a prime mover mounted thereon, means driven by the prime mover for raising and lowering the movable frame relative to the wheeled frame, a vertically disposed screw mounted on the movable frame, and having a pair of spiral vanes thereon for elevating the earth when the screw rotates, the upper end of the screw having a pair of vertically disposed vanes which are a continuation of the spiral vanes on the screw, the vertically disposed vanes being disposed above the ground when the movable frame is lowered to lower the screw to digging position, a semicircular member mounted on the movable frame and disposed behind the lower end of the screw having the spiral vanes thereon and terminating substantially at ground level, the semicircular member having a pair of plates secured to the front edges of the semicircular member and projecting rearwardly for packing the earth in the wall of the ditch cut by the screw as the wheeled framework moves forwardly, the upper end of the semi-circular plate member disposed behind the screw having fixed thereon a pair of diverging vanes adapted to move the earth expelled laterally by the vertically disposed vanes on the screw further away from the ditch, and means driven by the prime mover for raising and lowering the movable framework relative to the wheeled framework, the movable framework when in lowered position being adapted to rest by gravity on the upper surface of the wheeled framework.

10. In a ditch digger, a wheeled frame having a plurality of vertically disposed posts rising therefrom, an upper frame mounted for vertical movement on the posts, an engine carried by the upper frame, an earth-boring screw rotatably mounted in the upper frame in a fixed vertical position and connected to and driven by the engine, means on the upper frame driven by the engine and having connection with the lower frame for raising and lowering the upper frame to regulate the depth of penetration by the screw into the ground, the screw having a curved plate disposed therebehind and carried by the upper frame to assist the screw in elevating earth displaced by the screw, said curved plate at its upper end having rearwardly diverging vanes for deflecting laterally the earth raised by the screw and its associated curved plate when the ditch digger is moved forwardly on the ground, said screw having spirally disposed vanes on its lower half and substantially vertically disposed vanes on its upper half merging with the spiral vanes to thereby expel the earth raised by the spiral vanes radially of the screw.

ALBERT B. ROEHR.